United States Patent
Di Bitonto et al.

(10) Patent No.: US 7,140,111 B2
(45) Date of Patent: Nov. 28, 2006

(54) FOOD PEELER

(75) Inventors: Anthony Di Bitonto, Brooklyn, NY (US); Mark Prommel, New York, NY (US); Kevin Lozeau, Ridge, NY (US); Arsenio Garcia, Brooklyn, NY (US); Juan Escobar, New York, NY (US); Alec Drummond, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 210 days.

(21) Appl. No.: 10/428,267

(22) Filed: May 2, 2003

(65) Prior Publication Data

US 2004/0216307 A1 Nov. 4, 2004

(51) Int. Cl.
*A47J 17/02* (2006.01)
*B26B 5/00* (2006.01)

(52) U.S. Cl. .................. 30/279.6; 30/304; 30/337; 30/342; 99/588; 83/698.31

(58) Field of Classification Search ........... 30/123.5, 30/123.6, 123.7, 278, 279.2, 279.6, 280, 30/283, 329, 337, 340, 342, 299, 304, 334; 83/698.31; 99/584, 588, 590, 591; D7/695; 7/167

See application file for complete search history.

(56) References Cited

U.S. PATENT DOCUMENTS

| | | | | |
|---|---|---|---|---|
| 545,528 A | * | 9/1895 | Paul | 30/340 X |
| 842,173 A | * | 1/1907 | Carmen | 30/337 X |
| 1,209,725 A | * | 12/1916 | Kriz | 30/279.6 |
| 1,586,906 A | * | 6/1926 | Lewis | 30/337 X |
| 1,705,205 A | * | 6/1929 | Reams | 30/329 X |
| 2,028,915 A | * | 1/1936 | Ott | 30/283 |
| 2,043,907 A | * | 6/1936 | Troell | 30/337 |
| 2,106,796 A | * | 2/1938 | DeVault | 30/280 |
| 2,109,108 A | * | 2/1938 | Fesler | 30/337 |
| 2,237,354 A | | 4/1941 | Leavens | |
| 2,252,094 A | * | 8/1941 | Palmer | 30/279.6 |
| 2,274,815 A | * | 3/1942 | Whann | 30/279.6 |
| 2,756,501 A | * | 7/1956 | Linenfelser | 30/283 |
| 2,814,874 A | * | 12/1957 | Rosen | 30/278 |
| 2,831,379 A | * | 4/1958 | DeFore | 29/235 |
| 3,009,245 A | * | 11/1961 | Senkewitz | 30/155 |
| 3,169,316 A | * | 2/1965 | Johnston | 30/279.6 |
| 3,172,316 A | * | 3/1965 | Grieshaber | 29/270 |
| 3,201,869 A | * | 8/1965 | Gambino | 30/342 |
| 3,736,662 A | * | 6/1973 | Hartmann | 30/283 |
| 3,812,743 A | | 5/1974 | Shaw et al. | |
| 4,121,329 A | * | 10/1978 | Sugiyama | 29/270 |
| 4,159,567 A | | 7/1979 | Chen et al. | |
| 4,244,094 A | | 1/1981 | Rucinski | |
| 4,534,348 A | * | 8/1985 | Fedorov et al. | 606/166 |
| 4,592,140 A | | 6/1986 | Chasen | |

(Continued)

FOREIGN PATENT DOCUMENTS

GB 2 247 830 * 3/1992

(Continued)

*Primary Examiner*—Clark F. Dexter
(74) *Attorney, Agent, or Firm*—Seyfarth Shaw LLP

(57) ABSTRACT

The present invention provides for a food peeler having a removable blade that includes an end received in a bore of the food peeler handle and a resilient member is mounted adjacent to the end of the blade and allows for the blade to be moved between a centered and offset position so that the blade may be removed and replaced. A tool is provided in order to remove and replace the blade.

40 Claims, 4 Drawing Sheets

U.S. PATENT DOCUMENTS

| | | |
|---|---|---|
| 4,667,408 A | 5/1987 | Kirk |
| 4,776,092 A | 10/1988 | Moores et al. |
| 4,920,645 A * | 5/1990 | Baudouin .................... 30/162 |
| 5,165,173 A * | 11/1992 | Miller ......................... 30/392 |
| 5,237,749 A * | 8/1993 | Henning et al. ........... 30/123.6 |
| 5,325,593 A * | 7/1994 | Chen ......................... 30/279.6 |
| 5,406,684 A | 4/1995 | Carson |
| 5,518,114 A | 5/1996 | Kohring et al. |
| 5,787,593 A | 8/1998 | Althaus |
| 5,908,432 A * | 6/1999 | Pan ............................. 606/167 |
| 5,996,231 A | 12/1999 | Roche et al. |
| 6,244,150 B1 | 6/2001 | Holcomb et al. |
| 6,427,332 B1 | 8/2002 | Pi |
| 6,440,143 B1 | 8/2002 | Kasten |
| 2002/0043141 A1 | 4/2002 | Bradfield et al. |
| 2002/0174754 A1 | 11/2002 | Vincent |

FOREIGN PATENT DOCUMENTS

JP            6-277141     * 10/1994

* cited by examiner

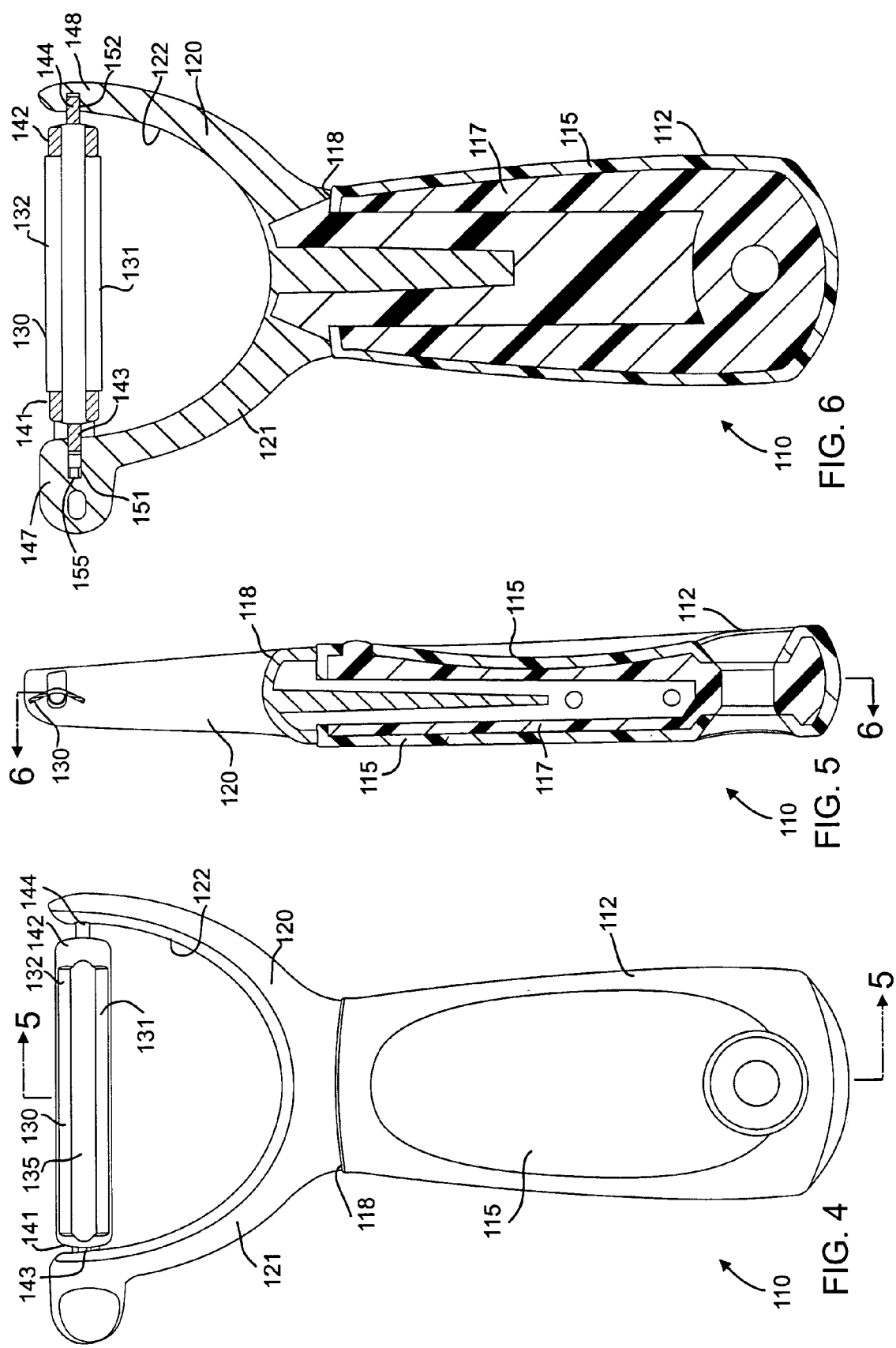

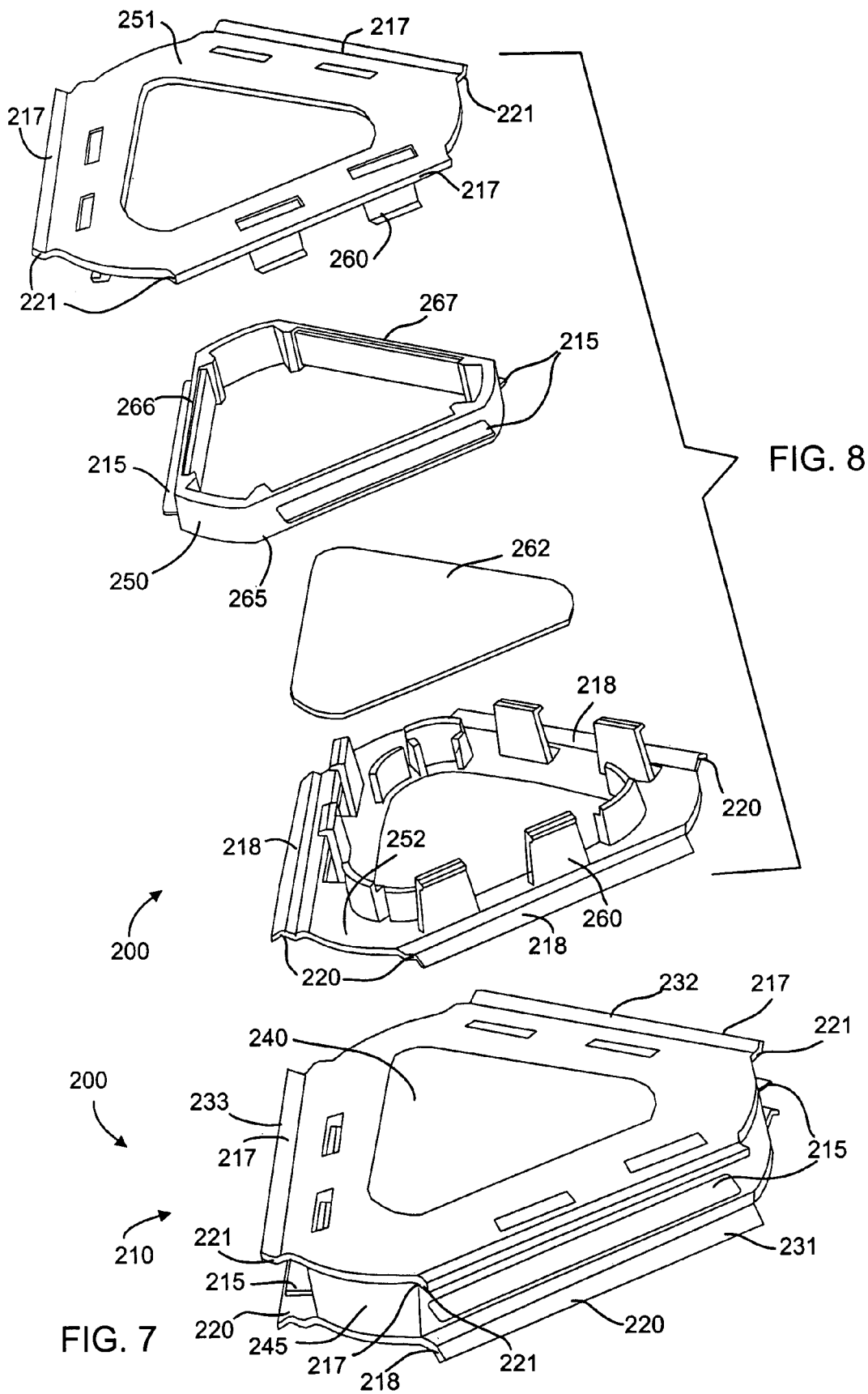

FOOD PEELER

The present invention pertains to a blade holding device and in particular a food peeler having a removable blade.

BACKGROUND

Many food peelers are known for peeling food items such as carrots, potatoes or apples that have a long flat blade having a pair of cutting surfaces for peeling the food item. In certain known devices, the blade is attached at one end and has a distal end which is free. The attached end of the blade is generally fixedly attached to a handle so that the consumer or end user of the device cannot remove the blade from the handle. Generally, the blade is secured by some mechanical means or welded in place within the handle.

Other types of peelers are either Y-shaped or have an L-shaped arm having mounting areas at each side to receive each end of the blade. In known embodiments, the blade can be mounted permanently between the two mounting areas formed by the arms by exerting sufficient force on the blade in order to forcibly insert each end of the blade into bores formed at each mounting area. The arms are generally formed of substantially rigid plastic or metal. High pressure machines are used in order to forcibly insert the blade by slightly flexing the arms away from each other or flexing the blade so that the blade may be the arms between. Upon mounting of the blade between the arms, the arms spring back to their static position and hold the blade fixedly therebetween. As the end user does not have the proper machinery to forcibly expand the arms, the blade cannot be removed. Therefore, for all of these devices where the blade is fixedly mounted, when the blade becomes dull, the entire peeling device must be discarded. Therefore, there is desired a food peeler that has a replaceable blade so that a dull blade may be removed and a new sharp blade replaced quickly and easily by an end user.

SUMMARY

The present invention provides for a food peeler comprising a handle having a grip and a working end, a blade having a first end and a second end, a bore formed in the working end of the handle and a resilient member mounted in the bore, the first end of the blade being removably mountable in the bore to abut the resilient member, wherein by sliding the blade so that the first end compresses the resilient member the blade may be mounted on or removed from the handle. In an embodiment, the handle may include an arm and the second end of the blade is attached to the arm. In an embodiment, the arm may include a bore for receiving the second end of the blade. In an embodiment, the blade may have a centered position where the first end of the blade abuts, but does not compress the resilient member, wherein the blade is retained in the handle. In an embodiment, the blade may have an offset position where the blade is moved from the centered position so that the first end is inserted further into its bore and compresses the resilient member so that the second end is removed from its recess so that the blade may be mounted on or removed from the handle.

In an embodiment, a tool is provided having an engagement mechanism for engaging the blade and for moving the blade between the centered and the offset positions and for removing the blade from the handle. In an embodiment, the engagement mechanism may include a longitudinal protrusion that engages a longitudinal slot of the blade. In an embodiment, the engagement mechanism may include a lip that frictionally engages the blade so that upon movement of the blade to the offset position, the tool grips the blade with sufficient force to remove the blade from the handle. In an embodiment, the arm forms generally a Y-shape having distal ends that may include the bore and recess, therein for receiving the first and second ends of the blade, respectively. In an embodiment, the arm may form generally an L-shape having a distal end having the recess formed therein and for receiving a second end of the blade. In an embodiment, the blade may include a finger at its first end for insertion into the bore. In an embodiment, the blade at its second end may include a distal portion that is not attached to the handle.

In an embodiment, the first end of the blade may include a locking member in order to restrict the first end of the blade from being removed from the bore receiving the first end. In an embodiment, the tool may include a plurality of cavities for receiving blades therein. In an embodiment, the tool may include a storage cavity for storing a blade therein. In an embodiment, the tool may include three cavities. In an embodiment, the tool may include a gripping surface in order to hold the tool so that the engagement member may engage a blade and grip the tool so that the tool may remove the blade. In an embodiment, the tool may include a housing and the cavity is formed along an edge of the housing. In an embodiment, the tool may be generally triangular shaped and includes three edges and three cavities respectively formed at the edges. In an embodiment, each cavity may include a longitudinal protrusion centered between a pair of longitudinal ledges. In an embodiment, each ledge may include a lip that frictionally engages the blade on each side in order to retain the blade in the cavity and so that the blade may be mounted on or removed from the handle.

In an embodiment, the tool may be formed of a central housing, a top plate and a bottom plate. In an embodiment, the central housing may form a plurality of longitudinal protrusions at each of its edges. In an embodiment, the top plate may form a plurality of ledges at each of its edges. In an embodiment, the bottom plate may form a plurality of ledges at each of its edges. In an embodiment, the tool may be assembled so that the central housing has the top plate attached on one side and the bottom plate attached on the other side. In an embodiment, the tool may include latch arms protruding from the top plate and bottom plate and each are snap-fit to the central housing. In an embodiment, the blade may include a cap provided at each end. In an embodiment, a finger engagement surface may be formed on one of the caps to help apply a force to the blade to slide the blade to the offset position and insert the cap at the opposite end into its respective bore and compress the resilient member. In an embodiment, the caps may be molded to the ends of the blade and each cap may include a resilient portion.

The present invention may also provide for a blade holding device comprising a handle having a grip and a working end having a bore, a blade having a first end and second end, an arm attached to the handle and having a recess, a resilient member provided in the bore, and one of the first or second ends of the blade received in the bore having the resilient member, so that upon movement of the blade to an offset position the blade compresses the resilient member so that the opposite end of the blade is removed from its respective recess and the blade may be mounted on or removed from the handle. In an embodiment, the resilient member may be connected to the blade. In an embodiment, the resilient member may be mounted within one of the bores. In an embodiment, each bore may include a resilient member mounted therein. In an embodiment, the arm may generally form an L-shape. In an embodiment, the arm may generally form a Y-shape with the handle. In an embodiment, the blade may include a pair of cutting surfaces for peeling a food item. In an embodiment, a tool may have an engagement mechanism that attaches to the blade to remove it to or from the handle. In an embodiment, the engagement mechanism may include a protrusion and a lip.

The present invention also provides for a food peeler comprising a handle, a shaft extending from the handling including a pair of mounting areas, a blade having a mounting member at each end and each mounting member received by a pair of mounting areas and at least one mounting area having a release mechanism for releasing a mounting member mounted thereto. In an embodiment, the blade may be a rectangular metal blade having a cap at each end providing the mounting members. In an embodiment, each mounting area may include a bore shaped generally corresponding to the mounting member. In an embodiment, the release mechanism may include a resilient member mounted in the bore and engaging the cap at the end of the blade. In an embodiment, a finger activation area may be provided by at least one of the caps. In an embodiment, each bore may be rectangular shaped for receiving a corresponding rectangular shaped cap therein in order to mount the blade to the shaft. The shaft includes a D-shaped opening and the shaft may have a proximal end and a distal end and a bore formed at each end for receiving the mounting members therein.

The present invention further provides for a removable blade for a food peeler comprising a generally rectangular shaped metal blade having a pair of mounting areas at each end and one of the mounting areas including a finger activation area. In an embodiment, a cap may be welded to the blade. In an embodiment, the caps may be insert molded to the blade. In an embodiment, a cap may include a mounting member protruding opposite the blade.

The present invention may further provide for a method of releasing a blade from a food peeler comprising the steps of applying a force to a first mounting area of the blade in a first direction generally parallel to the longitudinal axis of the blade, and causing a second mounting area at an end of the blade, opposite the first mounting area, to move in the first direction and depressing a resilient member mounted within a bore of the peeler upon moving the second mounting area against the resilient member and releasing the first mounting area from a first bore of the peeler and allowing the blade to pivot so that the first mounting area may be removed from the bore.

BRIEF DESCRIPTION OF THE DRAWINGS

For the purpose of facilitating an understanding the subject matter sought to be protected, there is illustrated in the accompanying drawings embodiments thereof, from an inspection of which, when considered in connection with the following description, the subject matter sought to be protected, its construction and operation, and many of its advantages should be readily understood and appreciated.

FIG. 4 is a top plan view of another embodiment of a food peeler of the present invention;

FIG. 5 is a sectional view taken at line 5—5 of FIG. 4;

FIG. 6 is a sectional view taken at line 6—6 of FIG. 5;

FIG. 7 is a perspective view of an assembled tool of the present invention;

FIG. 8 is an exploded perspective view of the tool of FIG. 7;

DETAILED DESCRIPTION

Figure 1:
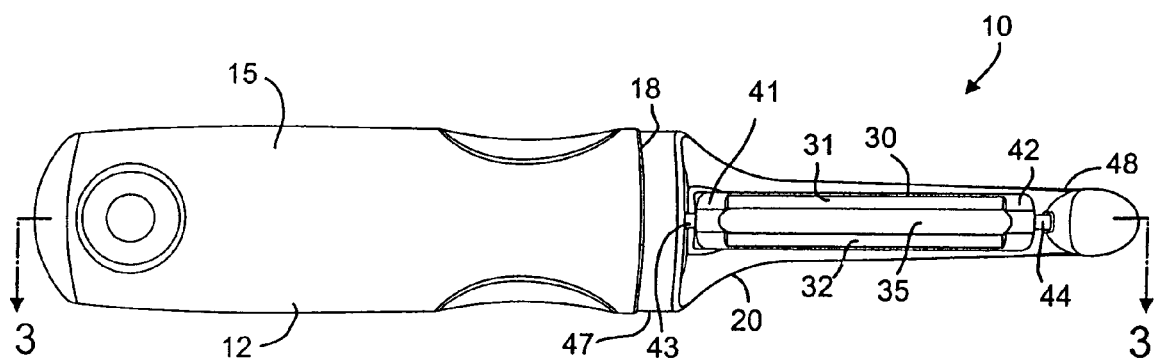
FIG. 1 is a top plan view of a food peeler of the present invention.

An embodiment of the present invention is described with reference to FIGS. 1–3. A food peeler 10 is provided having a handle 12 that has a grip 15 formed thereon. In an embodiment, the grip 15 is formed of a rubberized resilient material, such as a thermoplastic elastomer, molded over a core 17. In an embodiment, the grip 15 is insert molded over the core 17. The handle 12 includes a working end 18. Connected at the working end is an arm 20 or shaft. In the embodiment illustrated in FIGS. 1–3, the arm 20 forms a generally U-shape having a generally D-shaped opening 22 within which is mounted a blade 30.

The blade 30 generally is a metal rectangular shaped blade having a pair of cutting surfaces 31, 32 formed at the sides of a slot 35 formed longitudinally along the length of the blade 30. The blade includes a first end 41 and a second end 42. Generally the first end 41 forms a first mounting area and the second end 42 forms a second mounting area. Protruding from each of the first and second ends 41, 42 are fingers 43, 44 or mounting members. Each end 41, 42 of the blade 30 is mounted to the arm 20. The first end 41 is mounted at a proximal end 47 of the arm 20 and the second end 42 of the blade 30 is mounted at a distal end 48 of the arm 20. The fingers 43, 44 are respectively received within bores formed in the proximal and distal ends 47, 48 of the arm 20. In an embodiment, generally each bore is formed of a corresponding shape to receive its respective finger 43, 44. However, for clarity sake the bore at the proximal end 47 of the arm 20 will be identified as bore 51 and that at the distal end 48 as a recess 52. In an embodiment, the proximal end 47 of the arm 20 is protruding from the handle 12 and is formed of a material different than the grip 15. However, in an alternate embodiment, the proximal end 47 may be of one piece with the handle 12 and may be formed as one piece with the working end 18 of the handle 12. Likewise, in alternate embodiment, the bore 51 may be formed in the working end 18 of the handle 12.

Figure 2:
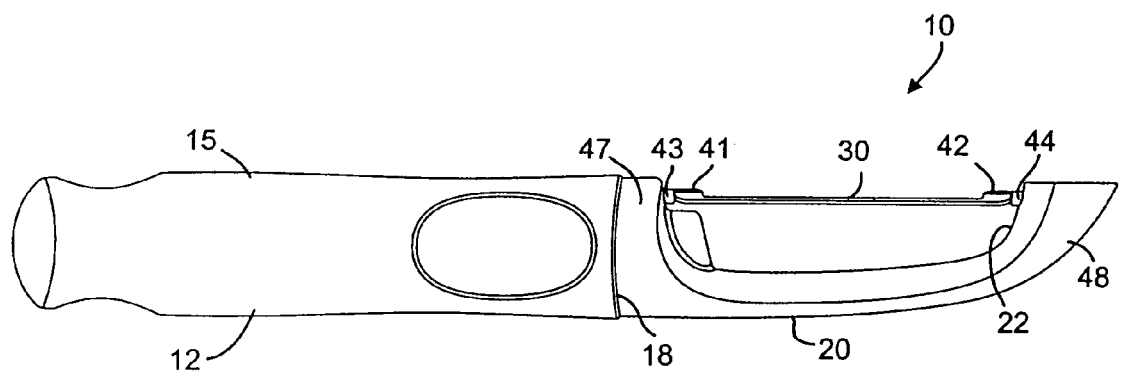
FIG. 2 is a side elevation view of the food peeler of FIG. 1.
Figure 3:
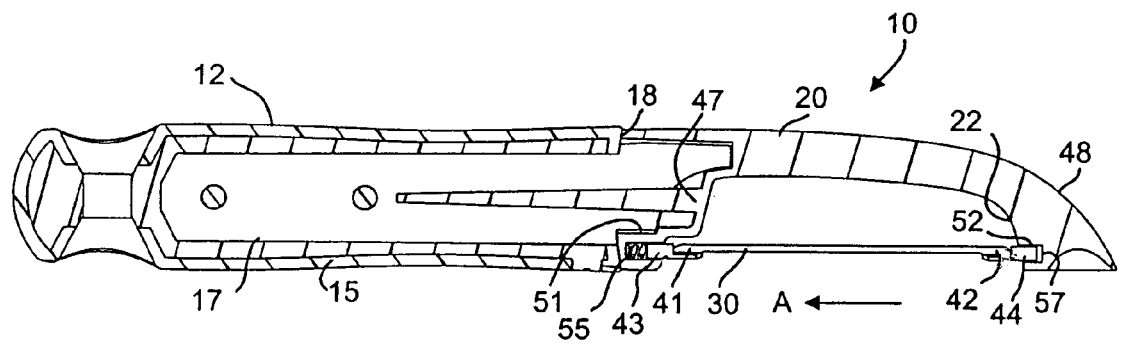
FIG. 3 is a sectional view taken at line 3—3 of FIG. 1.

In the embodiment disclosed in FIGS. 1–3, the bore 51 has mounted therein a resilient member 55. The resilient member 55 functions as a release mechanism for releasing the end 41 or mounting member 43 from the bore 51 or mounting area. In an embodiment, the resilient member 55 is a metal coil spring having a thermoplastic resin plug mechanically inserted into the spring. The plug acts as a stop abutment forte end 41 or finger 43 of the blade 30. In another embodiment, the resilient member 55 may be formed of a hard durometer thermoplastic resin cap overmolded onto a soft thermoplastic resin cap material forming a resilient body. The resilient plug is oriented in the bore 51 so that the hard cap abuts the end 41 or finger 43 of the blade. In a further alternate embodiment, the resilient member 55 may be connected to the blade. Other alternate embodiments of the resilient member 55 may be provided, such as, an uncooled coil spring, a rubberized member, an elastomerie plug or other member that provide for resiliency and/or elasticity. In an embodiment, the resilient member 55 is mount within the bore 51 via a mechanical means, for example, press-fitting or friction fitting the resilient member 55 therein where the inner diameter of the bore 51 is approximately equal to the outer diameter of the resilient member 55. However, other means of mounting the resilient member 55 within the bore 51 may be provided, for example, via adhesive or use of fasteners. In an alternate embodiment, the resilient member 55 may be allowed to freely rest within the bore 51 without any attachment means. In the embodiment disclosed in FIGS. 1–3, the resilient member 55 is only mounted within the bore 51, and the recess 52 has no resilient member. However, in an alternate embodiment the recess 52 may also include a resilient member mounted therein. An alternate embodiment of the invention may provide for a blade that is only mounted at a proximal end and the blade has a free distal end that is not attached. In such an embodiment, the proximal end of the blade is inserted in a bore of a handle. The bore includes a resilient member that is compressed when the proximal end of the blade is moved into the bore in order to remove the blade. A locking member maybe provided adjacent to the bore in order to release the proximal end from the bore when the resilient member is compressed.

The removal of the blade 30 will be explained as follows. The blade 30, as shown in FIG. 3, is oriented in a centered position where the first end 41 of the blade 30 is abutting against the resilient member 55, but is not compressing the resilient member 55. In a preferred embodiment, the finger 43 is abutting the side of the resilient member 55 but has very little, or slight compression thereon. In the centered position, the second end 42 of the blade 30 is provided in the recess 52 and a small gap 57 is provided at the bottom of the recess 52 adjacent the finger 44 of the second end 42 of the blade 30. However, the gap 57 is very small and does not allow for much, if any lateral movement (as viewed in FIG. 3) of the blade 30. The gap 57 and recess 52 are formed to allow for pivoting or swiveling of the blade 30. In an embodiment, the diameter of the recess 52 is larger than the outer diameter or width of the finger 44 and the diameter of the bore 51 is larger than the outer diameter or width of the finger 43 so that the blade 30 may pivot at least 10° in each direction above and below a horizontal orientation (as shown in FIGS. 2 and 3).

To remove the blade, pressure is applied to the blade 30 in a direction of arrow A, which is parallel to the longitudinal axis of the blade 30, in order to move the finger 41 against the resilient member 55 by inserting the finger 41 further into the bore 51. As the resilient member 55 compresses, the blade 30 is moved further into the bore 51 and the gap 57 increases, the finger 44 at the second end 42 begins to be removed from the recess 52. As the resilient member 55 is completely compressed, the blade 30 is moved to an offset position where the finger 44 at the second end 42 is completely removed from the recess 52. The blade then may be pivoted so that the second end 42 moves outward and away from the distal end 48 of the arm 20. Thereafter, the first end 41 may also be removed from the bore 51 and the blade 30 completely removed from the peeler 10. This removal process may be accomplished by operation of a user's fingers gripping portions of the blade 30. However, as will be described in more detail later, a tool may be used in order to remove the blade 30. In order to attach a different blade to the peeler 10, the above discussed steps are reversed.

Turning to FIGS. 4–6 another embodiment of the present invention is illustrated. A food peeler 110 is disclosed having handle 112 having a grip 115 formed over a core 117. The handle 112 includes a working end 118 having a pair of arms 120, 121 protruding from the working end 118. In the embodiment disclosed in FIGS. 4–6, the arms 120, 121 form a generally U-shaped member so that the entire peeler 110 has a generally Y-shaped form. The arms 120, 121 form a generally D-shaped opening 122 and have a blade 130 mounted thereon. The blade 130 includes a pair of cutting surfaces 131, 132 formed on either side of a slot 135. The blade 130 includes a first end 141 and a second end 142. Protruding from the ends 141, 142 are fingers 143, 144, respectively. The arm 121 includes a first end 147 and the arm 120 includes a second end 148. A bore 151 is formed in the first end 147 and a recess 152 is formed in the second end 148. The finger 143 of the first end 141 of the blade 30 is mounted in the bore 151 and the finger 144 of the second end 142 of the blade 30 is mounted in the recess 152 at the second end 148 of the arm 120. Mounted within the bore 151 is a resilient member 155 which compresses upon movement of the blade 130 to an offset position from its centered position (as shown in FIG. 6). As discussed above, the embodiment shown in FIGS. 4–6 includes a resilient member 155 mounted only in the bore 151. However, the recess 152 may also have a resilient member mounted therein in order to provide for the removal of the blade 130 from the peeler 110.

Turning to FIGS. 7–8, a tool 200 is illustrated that removes and/or stores blades. The tool 200 may be used for many types of blade holding devices, such as food peelers, razor blades or other devices including the embodiments of FIGS. 1–6 and 9–11. The tool provides for an engagement mechanism 210 including a longitudinal protrusion 215 and a pair of ledges 217, 218 formed longitudinally along each side of the protrusion 215. The ledges include respectively lips 220, 221, which are curved in order to frictionally engage the edge of a blade. In an embodiment, multiple cavities 231, 232, 233 are formed on the tool 200. Each cavity includes an engagement mechanism 210 comprising a pair of ledges 217, 218 and a longitudinal protrusion 215.

Each cavity 231, 232, 233 may act either as an engagement mechanism 210 for removing a blade, or a storage cavity for storing a blade. In an embodiment, the tool 200 may be received by the end user with a blade mounted in two of the cavities 231, 232 and the third cavity 233 will be empty. Therefore, a user may use the empty cavity 233 in order to remove a blade from the food peeler and then rotate the tool 200 to cavity 232; where a new blade is stored and use the tool 200 to mount the new blade from the cavity 232 to the food peeler, for example 10, 110 as discussed previously. Generally, the tool 200 is used by inserting the longitudinal protrusion 215 in a slot, for example slot 35 of the blade 30 of FIG. 1, and the lips 220, 221 grasp the edges of the blade 30 so that it may be removed or attached to a peeler or other device.

The tool 200 includes a gripping surface 240 so that the tool 200 may be easily gripped by a user's fingers when the tool is being used to remove or attach a blade to or from a food peeler. In an embodiment the tool 200 is formed generally of three parts that form a housing 245 consisting of a central housing 250, a top plate 251 and bottom plate 252. Each of the top plate and bottom plate 251, 252 include latch arms 260 that engage the inner side of the central housing 250 so that the top plate and bottom plate 251, 252 may be snap-fit to the central housing 250. A central panel 262 may be attached to the bottom plate 252. The central housing 250 forms edges 265, 266, 267. Provided at each of the edges 265, 266, 267 of the assembled tool an engagement mechanism 210 is formed. In the embodiment disclosed in FIG. 7–8, there are three edges having three engagement mechanisms 210. However, it is to be understood that the tool may be formed to have any number of engagement mechanisms 210 and those engagement mechanisms 210 may be formed at the edges or on other surfaces of the tool 200.

Figure 9:
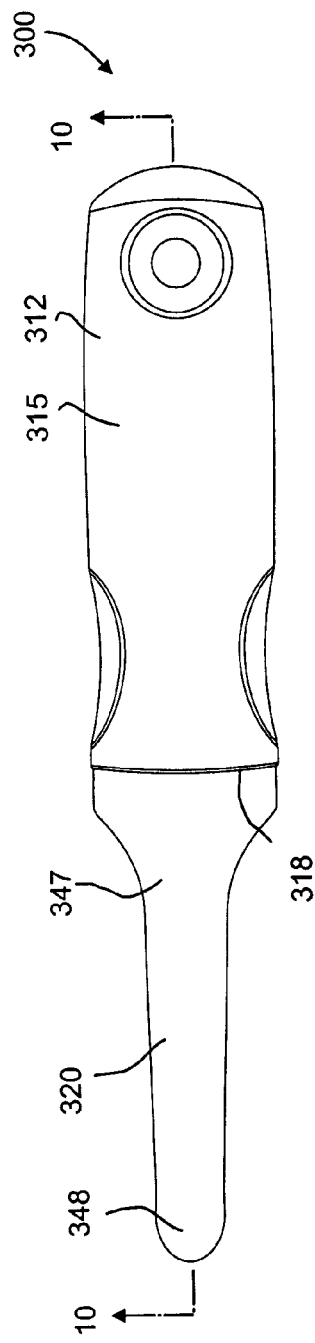
FIG. 9 is a bottom plan view of an additional embodiment of a food peeler of the present invention.
Figure 10:
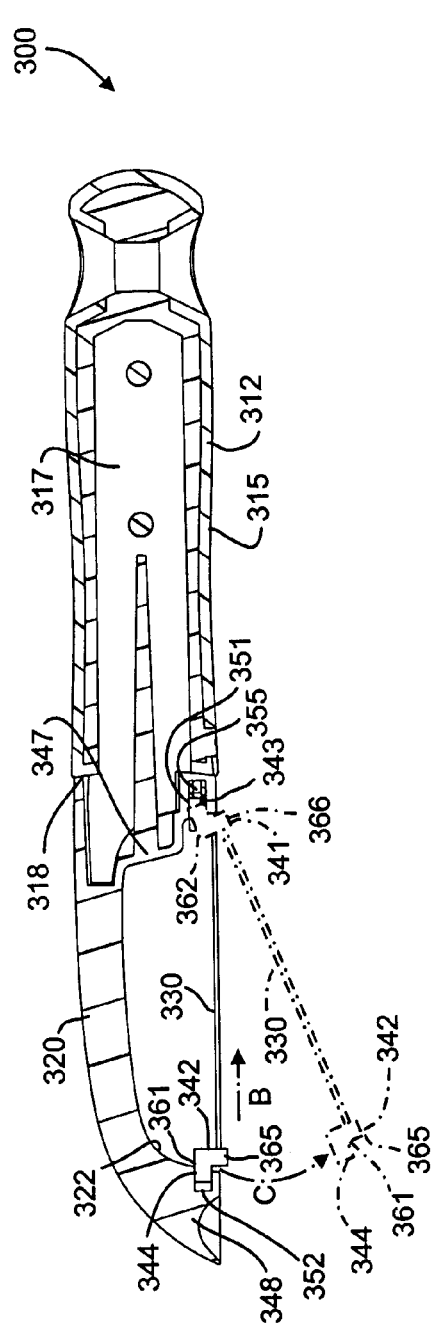
FIG. 10 is a sectional view taken at line 10—10 of FIG. 9 depicting a blade in a mounted and partially removed orientation.
Figure 11:
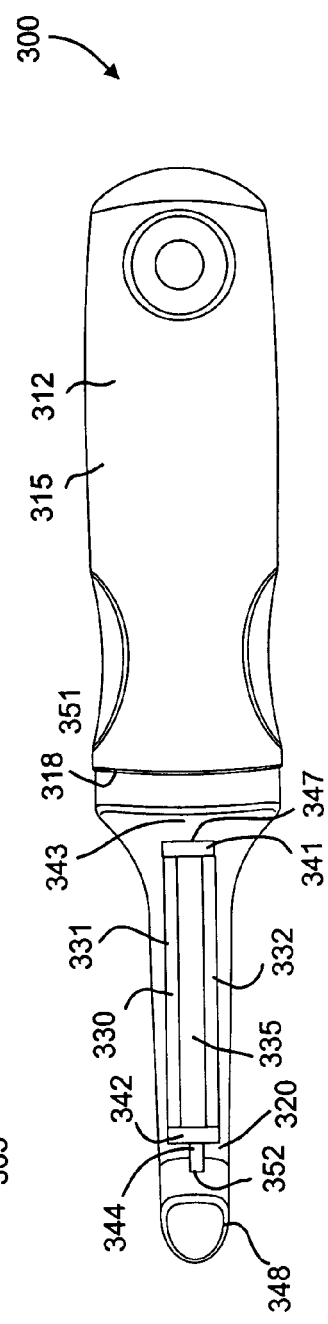
FIG. 11 is a top plan view of the food peeler of FIG. 9.

Turning to FIGS. 9–11, a further embodiment of the present invention is illustrated. A peeler tool 300 includes a handle 312 having a grip 315 and a core 317. The handle 312 includes a working end 318 and an arm 320 protruding therefrom. In the embodiment disclosed in FIGS. 9–11, the arm 320 is formed as one piece with the core 317 of the handle 312. However, in an alternate embodiment, the arm 320 may be formed separately and attached to the working end 318 of the handle 312. The arm 320 forms a D-shaped opening 322 to which is mounted a blade 330. The blade includes a pair of cutting surfaces 331, 332 formed on each side of a slot 335. The blade 330 includes a first end 341 and a second end 342. The first end 341 forms a first mounting area and the second end 342 forms a second mounting area. Protruding from the ends 341, 342 are fingers 343, 344, respectively. The first end 341 is mounted at a proximal end 347 of the arm 320 and the second end 342 of the blade 330 is mounted at a distal end 348 of the arm 320. A bore 351 is formed at the proximal end 347 and a recess 352 is formed at the distal end 348 of the arm 320 for receiving the fingers 343, 344 therein, respectively. A resilient member 355 is mounted within the bore 351.

Each end 341, 342 of the blade 330 includes a mounting member. Mounting members 361, 362, in an embodiment, are caps formed of a polymer material that are attached to the ends of the blade 330. In an embodiment, the mounting members 361, 362 are L-shaped and include fingers 343, 344 protruding therefrom. In an embodiment, the caps are molded over the metal ends of the blade 330. In an embodiment, the mounting members 361, 362 respectively include finger engagement surfaces 365, 366. Each finger engagement surface provides for a finger activation area. In an embodiment, each finger engagement surfaces 365, 366 has a surface shaped to receive a tip of an index finger of a user's hand. For example, the finger engagement surface 365, 366 may be formed of a resilient material or a surface having features to provide friction against a user's fingertip. Thus, upon pressure applied by a user's fingertip at the finger engagement surface 365, 366, the mounting members 361, 362 and the blade 330 are activated by moving the blade 330 longitudinally in order to release the blade 330 from the peeler 300.

With reference to FIG. 10 (which shows the blade 330 in a mounted and a partially removed orientation), the operation of the blade 330 will be discussed as follows. The blade 330 depicted generally parallel to the longitudinal axis of the handle 312 is in its mounted and centered position. In order to remove the blade 330, a user's finger is placed against the finger engagement surface 365 at the second end 342 of the blade 330. The user's finger applies pressure to the finger engagement surface 365 of the mounting member 361 in order to move the blade in direction of arrow B. The blade 330 is moved so that the first end 341 moves towards the handle 312 and the finger 343 is inserted further into the bore 351 in order to compress the resilient member 355. The finger 343 of the first end 341 is inserted far enough into the bore 351, so that the finger 344 at the second end 342 of the blade 330 is released from the recess 352. The finger 344 and second end 342 may then be pivoted away from the distal end 348 of the arm 320 in direction of arrow C. While gripping the finger engagement surface 365 of the cap at the mounting member end 361 with a pair of the user's fingers, the blade may then be removed from the peeler tool 300 by pulling the blade 330 so that the first end 341 and finger 343 are removed from the bore 351. In order to mount a new blade to the peeler 300, the above process is reversed.

Therefore, it may be understood that the embodiment illustrated in FIGS. 9–11 allows for removal and mounting of the blade 330 without the use of a tool. However, the blade 330 may be removed using a tool. For example, the blade 330 includes a slot 335 so that the tool described in FIG. 7–8 may also be used to aid in the removal and mounting of the blade 330. In an embodiment the blade 330 may have each end 341, 342 formed identically so that the blade 330 may be mounted with either end in either the bore 351 or the recess 352. In an alternate embodiment, the ends 341, 342 may be designated or polarized so that only one end may be received in the bore 351 and the opposing end in the recess 352. In an alternate embodiment, the mounting members 361, 362 may have a resilient member. In a further alternate embodiment, a resilient member may be formed with the cap or mounting member 361, 362 so that the bore 351 does not need to have a separate resilient member 355 mounted therein. In another alternate embodiment, each end 341, 342 of the blade 330 may have a resilient member attached thereto.

The matters set forth in the foregoing description and accompanying drawings is offered by way of illustration only and not as a limitation. While particular embodiments have been shown and described, it will be apparent to those skilled in the art that changes and modifications may be made without departing from the broader aspects of applicant's contribution. The actual scope of the protection sought is intended to be defined in the following claims when viewed in their proper perspective based on the prior art.

What is claimed:

1. A food peeler comprising:
   a handle having a grip and a working end, and an arm extending from the handle;
   a blade removably mounted to the handle, the blade having a first end and a second end, the second end removably attached to the arm;
   a bore formed in the working end of the handle and a resilient member mounted in the bore, and the blade disposed in a space between the handle and the arm; and
   the first end of the blade being removably mounted in the bore and in engagement with the resilient member, wherein by sliding the blade in a first longitudinal direction so that the first end compresses the resilient member, the blade may be moved in a second substantially opposite longitudinal direction for mounting or removal from the handle, whereby during removal of the blade from the handle, the blade is moved in a lateral direction out of the space between the handle and the arm.

2. The peeler of claim 1 wherein the arm includes a recess for receiving the second end of the blade.

3. The peeler of claim 2 wherein the blade has an offset position where the blade is moved from a centered position so that the first end is inserted further into the bore and compresses the resilient member so that the second end is removed from the recess so that the blade may be mounted on or removed from the handle.

4. The peeler of claim 3 in combination with a tool having an engagement mechanism for engaging the blade and for moving the blade between the centered and the offset positions and for mounting the blade on or removing the blade from the tool.

5. The combination of claim 4 wherein the engagement mechanism includes a longitudinal protrusion that engages a longitudinal slot of the blade.

6. The combination of claim 4 wherein to engagement mechanism includes a lip that frictionally engages the blade so that upon movement of to blade to the offset position, the tool grips the blade with sufficient force to remove the blade from the handle.

7. The peeler of claim 2 wherein the arm forms generally a Y-shape having distal ends that include the bore and recess therein for receiving the first and second ends of the blade, respectively.

8. The peeler of claim 2 wherein the arm forms generally an L-shape having a distal end having the recess formed therein and that receives the second end of the blade.

9. The peeler of claim 1 wherein the blade has a centered position wherein the first end of the blade abuts, but does not compress the resilient member, so that the blade is retained and may not be inadvertently removed from the handle.

10. The peeler of claim 1 wherein the blade includes a finger at its first end for insertion into the bore.

11. The peeler of claim 1 in combination with a tool including a plurality of cavities for receiving blades therein.

12. The combination of claim 11 wherein the tool includes a storage cavity for storing a blade therein.

13. The combination of claim 11 wherein the tool includes three cavities.

14. The combination of claim 11 wherein the tool includes a gripping surface in order to hold the tool so that an engagement member may engage a blade and by gripping the tool the blade may be removed.

15. The combination of claim 11 wherein the tool includes a housing and the cavity is formed along an edge of the housing.

16. The combination of claim 15 wherein the tool is generally triangular shaped and includes three edges and three cavities respectively formed at the edges.

17. The combination of claim 11 wherein each cavity includes a longitudinal protrusion centered between a pair of longitudinal ledges.

18. The combination of claim 17 wherein each ledge includes a lip that fictionally engages the blade on each side in order to retain the blade in the cavity and so that the blade may be removed from the handle.

19. The combination of claim 11 wherein the tool is formed of a central housing and a top plate and a bottom plate.

20. The combination of claim 19 wherein the central housing forms a plurality of longitudinal protrusions at each of its edges.

21. The combination of claim 19 wherein the top plate forms a plurality of ledges at each of its edges.

22. The combination of claim 19 wherein the bottom plate forms a plurality of ledges at each of its edges.

23. The combination of claim 19 wherein the tool is assembled so that the central housing has the top plate attached on one side and the bottom plate attached on the other side.

24. The combination of claim 19 wherein the tool includes latch arms protruding from the top plate and bottom plate and the latch arms are snap-fit to the central housing.

25. The peeler of claim 1 wherein the blade includes a cap provided at each end.

26. The peeler of claim 25 wherein a finger engagement surface is formed on one of the caps to help apply a force to the blade to slide the blade to an offset position and insert the cap at the opposite end into the bore and compress the resilient member.

27. The peeler of claim 1 wherein the caps are molded to the ends of the blade and each cap includes a resilient portion.

28. A culling device comprising:
a handle having a grip and a working end having a first bore;
a blade removably mounted to the handle, the blade having a first end and a second end;
an arm attached to the handle and having a second bore the blade disposed in a space between the bores;
a resilient member provided in one of the first and second bores; and
each end of the blade being removably mounted in one of the bores, and one of the first or second ends of the blade received in the bore having the resilient member so that upon movement of the blade in a first longitudinal direction to an offset position, the blade compresses the resilient member so that the opposite end of the blade is removed from its respective bore, and the blade is then moved in a second substantially opposite longitudinal direction for removal of the blade from the handle, whereby during removal of the blade, the blade is moved in a lateral direction out of the space between the bores.

29. The device of claim 28 wherein the resilient member is mounted within one of the bores.

30. The device of claim 28 wherein the arm generally forms an L-shape.

31. The device of claim 28 wherein the arm generally forms a U-shape.

32. The device of claim 28 wherein the blade includes a pair of cutting surfaces for peeling a food item and a slot formed between the cutting surfaces.

33. The device of claim 28 in combination with a tool having an engagement mechanism attached to the blade to remove or attach the blade to or from the handle.

34. The combination of claim 33 wherein the engagement mechanism includes a protrusion and a lip and the protrusion is received by the slot of the blade and the lip grasps the blade.

35. A food peeler comprising:
a handle;
a shaft extending from the handle, the shaft and the handle each including a mounting area;
a blade removably mounted to the handle and disposed in a space between the mounting areas, the blade having a mounting member at each end and each mounting member removably received in a bore of one of the mounting areas; and
at least one of the mounting areas having a release mechanism including a resilient member mounted in the bore and engaging one of the mounting members, wherein by sliding the blade in a first longitudinal direction, the one mounting member compresses the resilient member, the blade is then moved in a second substantially opposite longitudinal direction for removal from the handle, whereby during removal of blade, the blade is moved in a lateral direction from the space between the mounting areas.

36. The peeler of claim 35 wherein the blade is a rectangular metal blade having the mounting members formed by a cap.

37. The peeler of claim 36 wherein each of the bores has a shape generally corresponding to the shape of the cap.

38. The peeler of claim 37 wherein a finger activation area is provided by at least one of the caps.

39. The food peeler of claim 35 wherein the resilient member is mounted within a bore formed by one of the mounting areas.

40. The food peeler of claim 35 wherein the shaft generally forms an L-shape.

* * * * *